US010272604B2

(12) United States Patent
Ichikawa et al.

(10) Patent No.: US 10,272,604 B2
(45) Date of Patent: Apr. 30, 2019

(54) METHOD FOR ATTACHING THIN CYLINDRICAL ELEMENT TO MOLD CORE

(71) Applicants: HOSOKAWA YOKO CO., LTD, Tokyo (JP); THE JAPAN STEEL WORKS, LTD., Tokyo (JP)

(72) Inventors: Toru Ichikawa, Misato (JP); Koki Abe, Kawasaki (JP); Shoso Nishida, Hiroshima (JP); Kenji Kikukawa, Tokyo (JP)

(73) Assignees: HOSOKAWA YOKO CO., LTD., Tokyo (JP); THE JAPAN STEEL WORKS, LTD., Tokyo (JP)

( * ) Notice: Subject to any disclaimer, the term of this patent is extended or adjusted under 35 U.S.C. 154(b) by 621 days.

(21) Appl. No.: 15/089,202

(22) Filed: Apr. 1, 2016

(65) Prior Publication Data

US 2016/0214289 A1    Jul. 28, 2016

Related U.S. Application Data

(62) Division of application No. 13/634,866, filed as application No. PCT/JP2011/056066 on Mar. 15, 2011, now abandoned.

(30) Foreign Application Priority Data

Mar. 16, 2010   (JP) .................................. 2010-059323

(51) Int. Cl.
   *B29C 31/00*   (2006.01)
   *B29C 45/14*   (2006.01)
   (Continued)

(52) U.S. Cl.
   CPC ...... *B29C 45/14598* (2013.01); *B29C 31/002* (2013.01); *B29C 33/0016* (2013.01);
   (Continued)

(58) Field of Classification Search
   CPC ........ B29C 45/14065; B29C 45/14622; B29C 31/002
   See application file for complete search history.

(56) References Cited

U.S. PATENT DOCUMENTS

| 1,322,843 A | 11/1919 | Townsend |
| 3,900,941 A | 8/1975 | Browning et al. |
| 4,215,459 A | 8/1980 | Kifor |
| 5,518,854 A | 5/1996 | Yu et al. |
| 2004/0135288 A1 | 7/2004 | Tanaka et al. |

FOREIGN PATENT DOCUMENTS

| CN | 201268078 | 7/2009 |
| DE | 1778916 | 8/1971 |

(Continued)

OTHER PUBLICATIONS

Notice of Allowance in Russian Patent Application No. RU2012143728 dated Aug. 22, 2014.

(Continued)

*Primary Examiner* — Benjamin A Schiffman
(74) *Attorney, Agent, or Firm* — Nixon Peabody LLP; Jeffrey L. Costellia (57) ABSTRACT

The method for attaching a thin cylindrical element to a mold core is a method for attaching a film-like thin cylindrical element, which is formed in a cylindrical shape having a constant cross-sectional shape, to an outer surface of a mold core in a manner so as to cover the mold core. The method includes pressing the thin cylindrical element onto a tip portion of the mold core; guiding the thin cylindrical element to the base end side of the mold core while ejecting gas into between the mold core and the thin cylindrical element; and attaching the thin cylindrical element to the outer surface of the mold core in a manner so as to cover the mold core.

8 Claims, 6 Drawing Sheets

(51) Int. Cl.
  *B29C 45/43* (2006.01)
  *B29C 33/00* (2006.01)
  *B29L 23/00* (2006.01)
  *B29L 31/00* (2006.01)
  *B29K 623/00* (2006.01)
  *B29K 667/00* (2006.01)
  *B29K 705/02* (2006.01)

(52) U.S. Cl.
  CPC .. *B29C 45/14008* (2013.01); *B29C 45/14065* (2013.01); *B29C 45/14467* (2013.01); *B29C 45/14622* (2013.01); *B29C 45/14811* (2013.01); *B29C 45/43* (2013.01); *B29C 2045/14057* (2013.01); *B29K 2623/065* (2013.01); *B29K 2667/003* (2013.01); *B29K 2705/02* (2013.01); *B29L 2023/00* (2013.01); *B29L 2031/712* (2013.01)

(56) References Cited

FOREIGN PATENT DOCUMENTS

| | | |
|---|---|---|
| JP | S 60131223 | 7/1985 |
| JP | 04-158017 | 6/1992 |
| JP | A-06-091692 | 4/1994 |
| JP | 07-156188 | 6/1995 |
| JP | 2000-103428 | 4/2000 |
| JP | 2008-007178 | 1/2008 |
| RU | 2027601 | 1/1995 |

OTHER PUBLICATIONS

Office Action in Chinese Patent Application No. 201180018454.6 dated May 4, 2014.
International Search Report issued in Japanese International Patent Application No. PCT/JP2011/056066 dated May 31, 2011.
European Search Report issued in EP Patent Application No. 11756300.7 dated Jan. 15, 2016.

METHOD FOR ATTACHING THIN CYLINDRICAL ELEMENT TO MOLD CORE

CROSS REFERENCE TO RELATED APPLICATIONS

This application is a Divisional of U.S. patent application Ser. No. 13/634,866, filed Dec. 3, 2012, and entitled METHOD FOR ATTACHING THIN CYLINDRICAL ELEMENT TO MOLD CORE, PROCESS FOR PRODUCING CYLINDRICAL CONTAINER, AND MOLD CORE, which is a National Phase of PCT/JP2011/056066, filed Mar. 15, 2011, which claims the benefit of Japanese Patent Application No. 2010-059323, filed Mar. 16, 2010, the contents of which each are incorporated herein by reference in their entirety.

TECHNICAL FIELD

The present invention relates to a method for attaching a thin cylindrical element to a mold core, in which a film-like thin cylindrical element, which is formed in a cylindrical shape, is attached to an outer surface of a mold core in a manner covering the mold core, in order to form a trunk portion of a cylindrical container, such as a plastic container, a process for producing a cylindrical container, and a mold core.

BACKGROUND ART

In recent years, containers having the thinnest possible walls are provided in order to reduce the amount of plastic that needs to be disposed. For example, a plastic container formed using a thin plastic laminate film is disclosed in Patent Document 1. This plastic container has a cylindrical shape with the bottom, and includes a trunk portion formed in a cylindrical shape using a plastic laminate film and molded portions coupled with one end and the other end of the trunk portion by insertion injection molding means.

Patent Document 1 discloses that a cylindrical element made of a plastic laminate film is attached to a mandrel used as a mold core in a manner covering the mandrel. In the technique described in Patent Document 1, the cylindrical element is attached to the mandrel in a manner covering the mandrel, and the mandrel is mounted on a molding tool. Thereafter, a melted plastic resin material is injected into a mold cavity within the molding tool by the insertion injection molding means, to form the molded portions connected to the one end and the other end of the cylindrical element, thereby molding the above plastic container.

CITATION LIST

Patent Document

[Patent Document 1] Japanese Patent Application, First Publication No. 2000-103428

SUMMARY OF INVENTION

Technical Problem

Incidentally, in the mold to mold the plastic container disclosed in Patent Document 1, usually, molding spaces to mold the above molded portions are formed so as to be larger than the molded portions after molding in consideration of shrinkage of injected resin after molding. On the other hand, as for the cylindrical element that forms the trunk portion, it is necessary to attach the cylindrical element to the mandrel (mold core) in a manner covering the mandrel without a gap in consideration of the appearance quality after molding.

If the cylindrical element is formed so as to be slightly larger than the mold core, there is a tendency for wrinkles or the like to be generated at junctions between the trunk portion and the molded portions due to shrinkage at the molded portions of the plastic container after molding. Therefore, deterioration of appearance quality or functionality may be caused.

More specifically, in addition to the deterioration of appearance quality due to wrinkles or the like, the generation of wrinkles or the like and the shrinkage of the molded portions interact with each other, and sealing performance may be degraded at the junctions between the trunk portion and the molded portions. For this reason, it is necessary to attach the cylindrical element having an internal diameter equal to or less than the diameter of the mold core, to the mold core in a manner covering the mold core.

However, since the operations of attaching the cylindrical element to the mold core in a manner covering the mold core without a gap requires attaching the cylindrical element while stretching it, a substantial amount of time and effort are taken. If the cylindrical element is formed so as to be slightly larger than the mold core as mentioned above, attachment performance is improved, but quality of appearance or the like cannot be maintained.

In order to cope with this situation, usually, the mold core is formed in a tapered form having a diameter which decreases toward the tip thereof, and the cylindrical element is also formed in a tapered form having a diameter which decreases toward the tip thereof (the diameter increases toward the mold core), whereby attachment performance of the cylindrical element to the mold core is improved, and extraction performance of a molded product (plastic container) is also enhanced. However, in this technique, it is necessary to form the cylindrical element in a cylindrical shape with a taper at every molding, and to attach the cylindrical element to the mold core in a manner covering the mold core. Thus, this technique requires a substantial amount of time and effort in order to produce the cylindrical element, and is not favorable in terms of manufacturing costs or manufacturing efficiency.

The present invention has been made in view of the relevant circumstances. The present invention provides a method for attaching a thin cylindrical element to a mold core, a process for producing a cylindrical container, and a mold core, which can reduce the manufacturing costs of a cylindrical container, can improve manufacturing efficiency, and can also maintain the quality of the cylindrical container, in a case where the thin cylindrical element formed from a plastic laminate film or the like is attached to the mold core in a manner covering the mold core, to thereby mold the cylindrical container.

Solution to Problem

According to a first aspect of the present invention, a method for attaching a thin cylindrical element to a mold core is a method in which a film-like thin cylindrical element, which is formed in a cylindrical shape having a constant cross-sectional shape, is attached to an outer surface of a mold core in a manner so as to cover the mold core. The method includes: pressing the thin cylindrical element onto a tip portion of the mold core; guiding the thin cylindrical element to a base end side of the mold core while ejecting gas into between the mold core and the thin cylindrical element; and attaching the thin cylindrical element to the outer surface of the mold core in a manner so as to cover the mold core.

In this case, the mold core may be formed in a rod-like body having a constant outer circumferential length, and the outer circumferential length may be set to be greater than or equal to an inner circumferential length of the thin cylindrical element.

Additionally, in this case, an outer diameter of the mold core may be set so as to become maximized at at least a base end of the mold core.

Additionally, in this case, an outer surface of the tip portion of the mold core may be formed with a gas ejection hole, and gas may be ejected into between the mold core and the thin cylindrical element from the gas ejection hole.

Additionally, in this case, the outer surface of the tip portion of the mold core may be formed with a groove portion, and the groove portion may be formed with the gas ejection hole.

Additionally, in this case, the tip portion of the mold core may be provided with an inducing portion that facilitates pressing the thin cylindrical element.

Additionally, in this case, the inducing portion may be a chamfered portion formed at the tip portion of the mold core.

Additionally, in this case, the inducing portion may be a separate body core that is attached to the tip portion of the mold core and has an outer diameter less than the outer diameter of the mold core.

Additionally, in this case, a cylindrical container may be produced using the method for attaching a thin cylindrical element to a mold core described in any one of the above descriptions.

According to a second aspect of the present invention, a mold core is for attaching a film-like thin cylindrical element, which is formed in a cylindrical shape having a constant cross-sectional shape, to an outer surface thereof in a manner so as to cover the mold core. The mold core is formed in a rod-like body having a constant outer circumferential length, the outer circumferential length is set to be greater than or equal to an inner circumferential length of the thin cylindrical element, and an outer surface of a tip portion of the mold core is formed with a gas ejection hole to eject air.

In this case, the outer surface of the tip portion may be formed with a groove portion, and the groove portion may be formed with the gas ejection hole.

Additionally, in this case, the tip portion of the mold core may be formed with an inducing portion that facilitates pressing the thin cylindrical element.

Effects of Invention

According to the first and second aspects of the present invention, in a case where a film-like thin cylindrical element is attached to a mold core in a manner covering the mold core, to thereby mold a cylindrical container, the manufacturing costs of the cylindrical container can be reduced, manufacturing efficiency can be improved, and the quality of the cylindrical container can also be maintained.

DESCRIPTION OF EMBODIMENTS

Embodiments of the present invention will be described below with reference to the drawings.

First Embodiment

Figure 1:
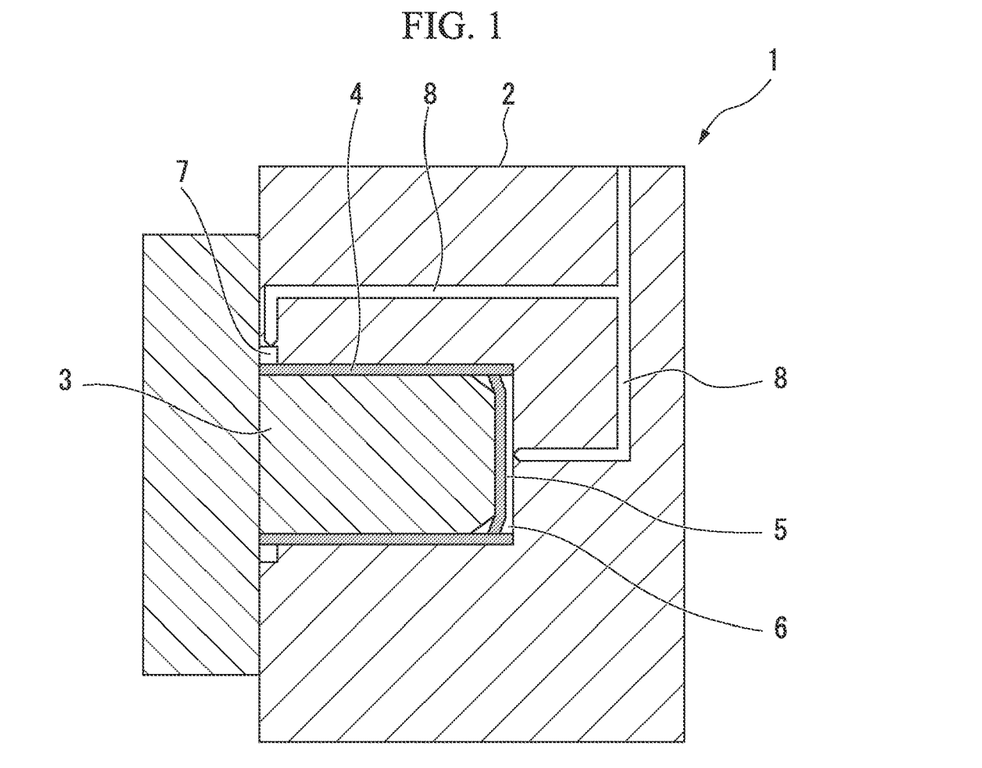
FIG. 1 is a schematic configuration view of a molding tool related to a first embodiment of the present invention.

FIG. 1 is a schematic configuration view of a molding tool 1 for molding a plastic container. The molding tool 1 shown in FIG. 1 includes a stationary mold 2 and a columnar mandrel 3 used as a mold core. The mandrel 3 is movable forward and backward with respect to the stationary mold 2. The mandrel 3 is mounted on the stationary mold 2 in a state where a laminated cylindrical element 4 that is an example of a thin cylindrical element is attached to the external surface (outer peripheral surface) of the mandrel 3 in a manner covering the mandrel 3 and a circular film 5 is made to abut against the tip of the mandrel 3.

The mandrel 3 is formed in a columnar shape with a constant cross-sectional shape (a cross-section in a direction orthogonal to the longitudinal direction) from the base end side to a part short of the tip portion (part excluding a chamfered portion 13 to be described below). That is, the mandrel 3 is formed in a rod-like body with a constant outer circumferential length in the interval from the base end side to the part short of the tip portion. On the other hand, the laminated cylindrical element 4 is formed using a plastic laminate film as a material. The laminated cylindrical element 4 is formed in a cylindrical body with a constant cross-sectional shape (a cross-section in the direction orthogonal to the longitudinal direction) in order to form a tubular (cylindrical) trunk portion of a plastic container to be molded. That is, the laminated cylindrical element 4 is formed in a cylindrical shape in which its cross-sectional shape is a circular shape with a constant diameter, and has a constant inner circumferential length. Additionally, the circular film 5 forms a portion of the bottom of the plastic container. Moreover, although the tip portion of the mandrel 3 has a tapered shape, the tip portion will be described below in detail.

The stationary mold 2 is formed with a space corresponding to the shape of a plastic container to be molded. A molding space 6 for forming a disk-shaped bottom of the plastic container is formed between the tip of the mandrel 3 and the stationary mold 2 in a state where the mandrel 3 is mounted on the stationary mold 2. Additionally, an annular molding space 7 surrounding the external surface (outer peripheral surface) of the laminated cylindrical element 4 is formed between a base-side lateral face (base-side outer peripheral surface) of the mandrel 3 and the stationary mold 2. The molding space 6 and the molding space 7 that are cavities communicate with a runner 8 (channel) for filling them with melting resin provided in the stationary mold 2. Thereby, melting resin flows to the molding space 6 and the molding space 7.

The laminated cylindrical element 4 attached to the mandrel 3 in a manner covering the mandrel 3 will be described in detail.

The laminated cylindrical element 4 is a cylindrical body with both end openings, which is formed by overlapping and joining the side ends of a plastic laminate film that is a material that is cut in a rectangular shape. In addition, if necessary, the laminated cylindrical element 4 may be a cylindrical body with both end openings, which is formed by butting and joining the side ends of a material, or may be a cylindrical body with both end openings, which is formed by overlapping side ends and then joining the side ends with an adhesive (sticky) tape from the inside. Additionally, as the plastic laminate film that is a material of the laminated cylindrical element 4, if a moisture-proof property or a gas barrier property is taken into consideration, a material obtained by laminating a polyethylene film with a thickness of 70 microns, a polyester film with a thickness of 12 microns, an aluminum foil with a thickness of 12 microns as a barrier materials, and a polyethylene film with a thickness of 70 microns is suitable. Additionally, the plastic laminate film may be a material obtained by laminating cast polypropylene with a thickness of 70 microns, a polyester film with a thickness of 12 microns, an aluminum foil with a thickness of 12 microns, and cast polypropylene with a thickness of 70 microns. Additionally, the plastic laminate film may be a material obtained by laminating cast polypropylene with a thickness of 70 microns, a polyester film with a thickness of 12 microns, and cast polypropylene with a thickness of 70 microns. Additionally, instead of metallic foils, such as an aluminum foil, a material obtained by vapor-depositing metals, such as aluminum or magnesium, on a plastic film as a barrier material, a material obtained by vapor-depositing metal oxides, such as aluminum oxide or silicon oxide, on a plastic film, a coating film or the like formed by coating barrier films, such as polyvinyl alcohol or ethylene-vinylalcohol copolymer system, or barrier materials, such as polyvinylidene chloride, on a plastic film can be used. In addition, a laminated cylindrical element 4 made of a plastic laminate film as a laminate material is used in the present embodiment. However, a cylindrical element made of a material obtained by laminating plastics or an aluminum foil on paper or a unilaminate film-like material may be used. That is, the cylindrical element may be a film-like material made of a material having elasticity.

Figure 2:
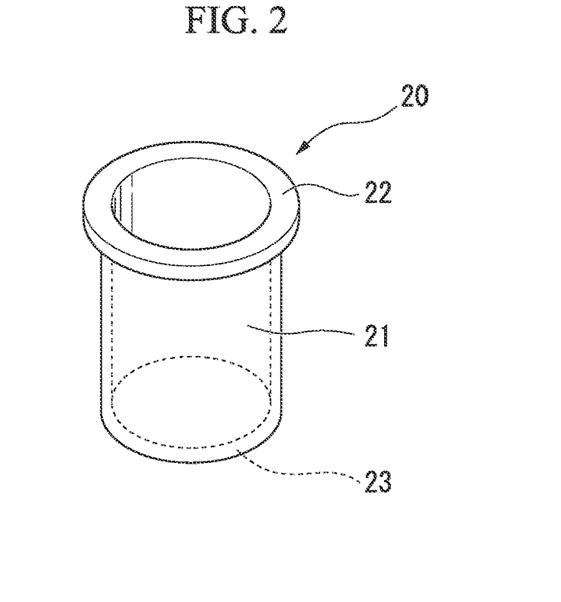
FIG. 2 is a perspective view showing an example of a plastic container molded using the molding tool related to the first embodiment of the present invention.

A plastic container to be molded using the molding tool 1 is a bottomed cylindrical container, and a plastic container 20 molded in the molding tool 1 is shown in FIG. 2. As shown in FIG. 2, the plastic container 20 includes a trunk portion 21 molded in a cylindrical shape by the laminated cylindrical element 4, an upper molded portion 22 molded integrally with one end of the trunk portion 21, and a lower molded portion 23 molded integrally with the other end of the trunk portion 21. The upper molded portion 22 is an annular molded body, and is provided on the outer peripheral surface of the one end of the trunk portion 21. The upper molded portion 22 is a part formed by the molding space 7. The lower molded portion 23 is a disk-shaped molded body, and is provided so as to block the other end of the trunk portion 21. The lower molded portion 23 is a part formed by the molding space 6, and is combined integrally with the circular film 5.

Figure 3:
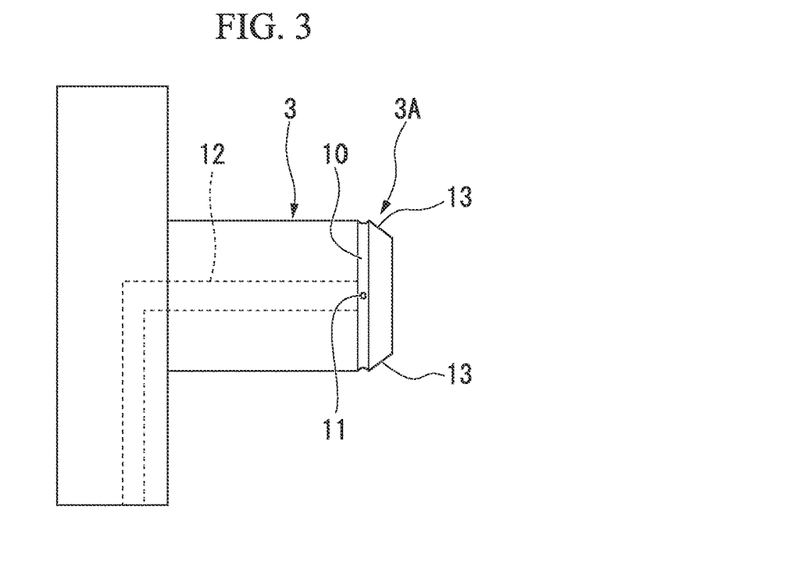
FIG. 3 is a schematic configuration view of a mold core in the molding tool related to the first embodiment of the present invention.

Next, the mandrel 3 will be described with reference to FIG. 3. In the mandrel 3, the outer peripheral surface of a tip portion 3A of the mandrel 3 is formed with a groove portion 10 running in the circumferential direction thereof, and the groove portion 10 is formed with an ejection hole (gas ejection hole) 11 to eject air. The ejection hole 11 communicates with an air communication passage 12 formed inside the mandrel 3, and is capable of ejecting the air pumped from the air communication passage 12 to the outside. In addition, gases other than air may be ejected from the ejection hole 11, for example, inert gas (argon gas or the like) may be ejected. Additionally, the tip portion 3A of the mandrel 3 is formed with the chamfered portion 13 that is an inducing portion for facilitating pressing the laminated cylindrical element 4, and thus the tip portion 3A of the mandrel 3 has a tapered shape.

The external diameter of the portion excluding the chamfered portion 13 in the mandrel 3 is set to be greater than the internal diameter of the laminated cylindrical element 4 before the attaching and covering. That is, the outer circumferential length of the portion excluding the chamfered portion 13 in the mandrel 3 is set to be greater than the inner circumferential length of the laminated cylindrical element 4 before the attaching and covering.

Additionally, the external diameter on the tip side of the chamfered portion 13 is set to be less than the internal diameter of the laminated cylindrical element 4 before the attaching and covering. Therefore, the laminated cylindrical element 4 can be easily pressed and fitted onto the chamfered portion 13.

A procedure of molding the plastic container 20 using the molding tool 1 will be described.

Figure 4:
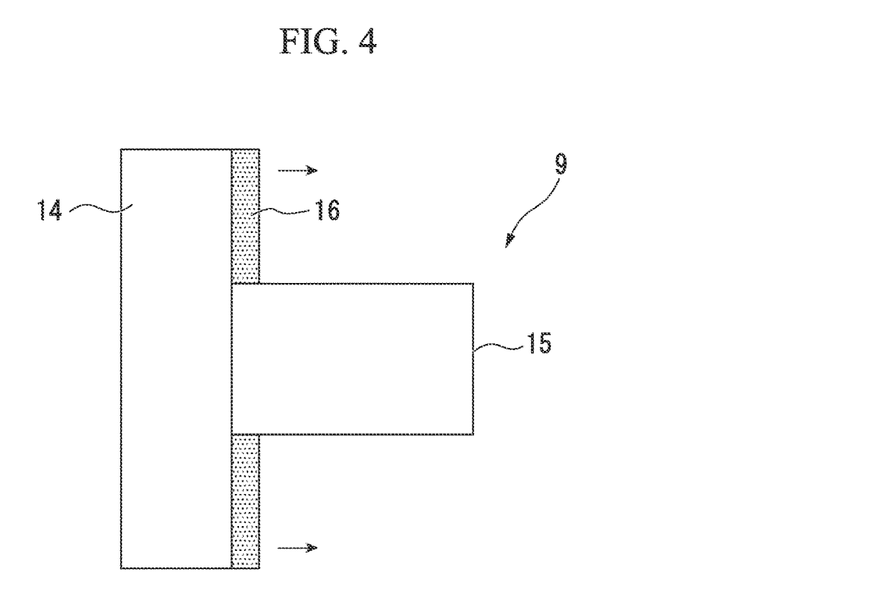
FIG. 4 is a schematic configuration view of a delivery jig that is an apparatus that attaches a plastic laminate film to the mold core related to the first embodiment of the present invention.

First, the laminated cylindrical element 4 is attached to the mandrel 3. In the present embodiment, the laminated cylindrical element 4 is attached to the mandrel 3 using a delivery jig 9 shown in FIG. 4. The delivery jig 9, as shown in FIG. 4, includes a columnar delivery jig body 15 that protrudes from a plate-shaped base part 14 and a movable part 16 that is provided radially outside the delivery jig body 15 so as to be slidable in the axial direction (the direction shown by the arrow in the drawing) of the delivery jig body 15. The external diameter of the delivery jig body 15 is set so that the laminated cylindrical element 4 can be attached to the external surface of the delivery jig body 15.

A procedure of attachment of the plastic laminate films (the laminated cylindrical element 4 and the circular film 5) from the delivery jig 9 to the mandrel 3 in the present embodiment will be described below in detail with reference to FIGS. 5 to 7.

Figure 5:
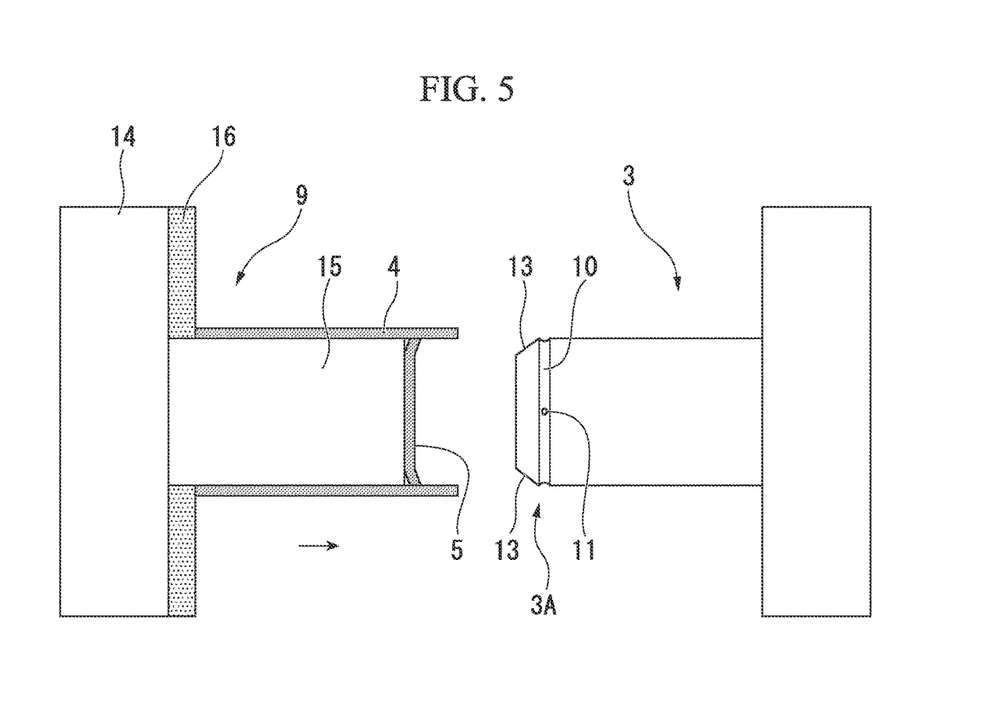
FIG. 5 is a view illustrating attachment of the plastic laminate film to the mold core related to the first embodiment of the present invention.

First, as shown in FIG. 5, the laminated cylindrical element 4 is attached to the external surface of the delivery jig body 15 in a manner covering the delivery jig body 15. The laminated cylindrical element 4 is brought into a state where an end portion thereof protrudes slightly from the tip of the delivery jig body 15. Additionally, the circular film 5 is beforehand fitted into the inside of the laminated cylindrical element 4 at the end portion thereof, and is brought into a state of abutting the tip of the delivery jig body 15. In this state, as shown in FIG. 5, the tip of the delivery jig body 15 and the tip of the mandrel 3 are arranged so as to face each other.

Figure 6:
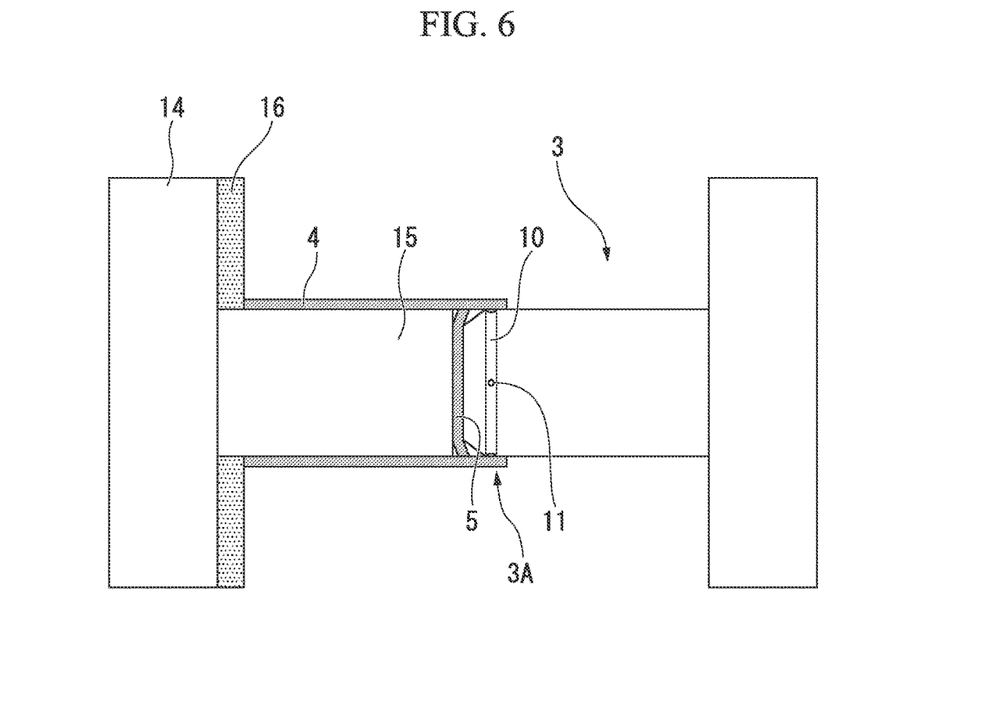
FIG. 6 is a view illustrating attachment of the plastic laminate film to the mold core related to the first embodiment of the present invention.

Next, as shown in FIG. 6, the tip of the delivery jig body 15 is brought close to the mandrel 3 so as to abut the tip of the mandrel 3, and the part of the laminated cylindrical element 4 that protrudes out from the delivery jig body 15 is pressed onto the tip portion 3A of the mandrel 3. Although the outer circumferential length of the mandrel 3 is set to be greater than or equal to the inner circumferential length of the laminated cylindrical element 4, pressing of the laminated cylindrical element 4 is easily permitted because the chamfered portion 13 is formed at the tip portion 3A of the mandrel 3. That is, the laminated cylindrical element 4 is easily fitted to the tip portion 3A.

Next, air is ejected from the ejection hole 11 of the mandrel 3 in a state where the laminated cylindrical element 4 is pressed onto the tip portion 3A. Since the ejection hole 11 is formed in the groove portion 10, air can be efficiently blown into between the mandrel 3 and the laminated cylindrical element 4. That is, since the groove portion 10 is formed over the whole circumference of the tip portion 3A, air can be blown into between the mandrel 3 and the laminated cylindrical element 4 over the whole circumference. In addition, the ejection hole 11 may be formed in the outer peripheral surface of the mandrel 3 without forming the groove portion 10. In this case, in order to blow air into between the mandrel 3 and the laminated cylindrical element 4 over the whole circumference, it is preferable to form a plurality of ejection holes 11 in the circumferential direction of the mandrel 3.

If air is ejected from the ejection hole 11, the laminated cylindrical element 4 pushed by the pressure of the ejected air expands radially outward. Therefore, the internal diameter of the laminated cylindrical element 4 becomes slightly greater than the external diameter of the portion excluding the chamfered portion 13 in the mandrel 3. Hence, it is possible to easily move the laminated cylindrical element 4 in the axial direction of the mandrel 3.

Figure 7:
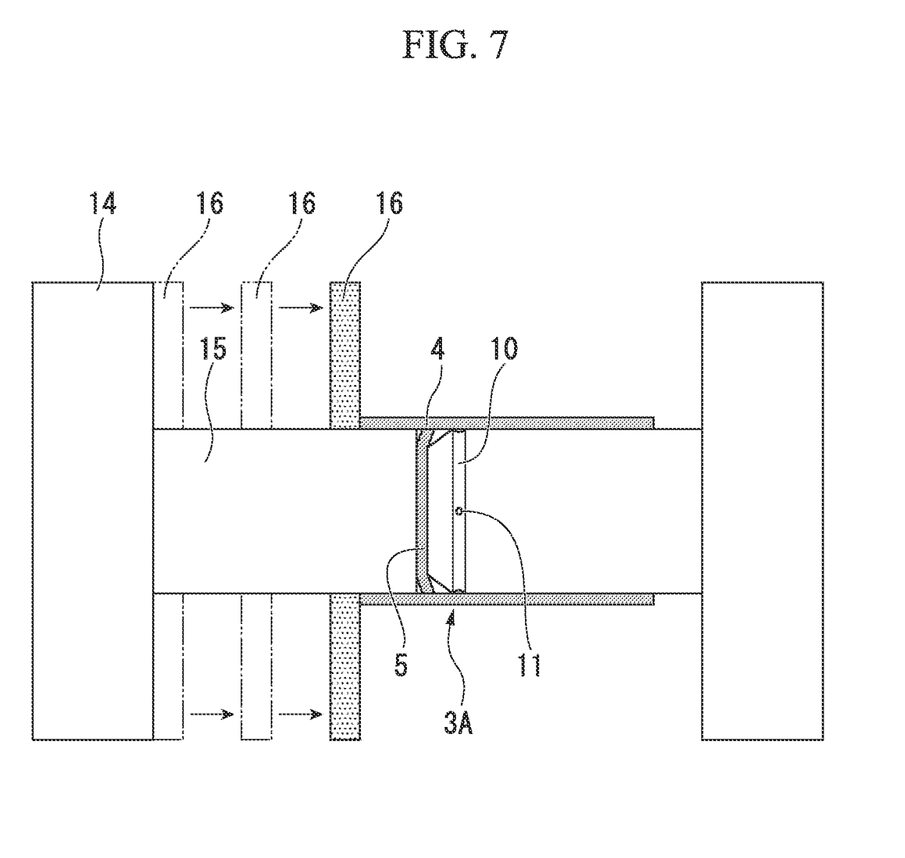
FIG. 7 is a view illustrating attachment of the plastic laminate film to the mold core related to the first embodiment of the present invention.

Next, as shown in FIG. 7, the movable part 16 of the delivery jig 9 is moved in the axial direction (toward the tip side of the delivery jig body 15, the direction shown by the arrow in the drawing) of the delivery jig body 15 while ejecting air from the ejection hole 11. Thereby, the movable part 16 abuts the laminated cylindrical element 4, and the laminated cylindrical element 4 is guided so as to be attached to the mandrel 3 in accordance with moving the movable part 16 forward. Additionally, the circular film 5 slides relatively inside the laminated cylindrical element 4 as the movable part 16 moves the laminated cylindrical element 4.

The movable part 16 moves the laminated cylindrical element 4 by a predetermined distance, to cause the laminated cylindrical element 4 to reach the base end part of the mandrel 3. If the ejecting of air from the ejection hole 11 is stopped, the pressure of the air that has expanded the laminated cylindrical element 4 disappears, and thus, the laminated cylindrical element 4 is restored to its internal diameter before the expansion. The external diameter of the mandrel 3 is set to be greater than the internal diameter before the expansion of the laminated cylindrical element 4, and the laminated cylindrical element 4 is attached to the outer peripheral surface of the mandrel 3 in a manner covering the mandrel 3 without a gap. The laminated cylindrical element 4 is attached to the overall mandrel 3 in a manner covering the mandrel 3 (the state shown in FIG. 1), and thereby attachment of the laminated cylindrical element 4 to the mandrel 3 is completed.

In the present embodiment, the attachment of the laminated cylindrical element 4 to the mandrel 3 is made in this way. In the subsequent molding, as shown in FIG. 1, the mandrel 3 is mounted on the stationary mold 2, and a synthetic resin material is injected into the molding space 6 and the molding space 7 in a molten state through the runner 8 from a gate (synthetic resin supply portion) provided in the stationary mold 2 by insertion injection molding means. As this synthetic resin material hardens, the upper molded portion 22 and the lower molded portion 23 of the plastic container 20 shown in FIG. 2 are molded. In addition, in the present embodiment, the synthetic resin material injected by the insertion injection molding means and the circular film 5 are integrated to mold the lower molded portion 23. However, the lower molded portion 23 may be formed only using the insertion injection molding means without using the circular film 5.

Additionally, in the molding tool 1 of the present embodiment, removal (extraction) of the plastic container from the mold after molding can also be easily performed if air is ejected from the ejection hole 11 of the mandrel 3 after molding.

In the present embodiment described above, the laminated cylindrical element 4 is attached to the external surface of the mandrel 3 in a manner covering the mandrel 3 by pressing the laminated cylindrical element 4 onto the tip portion 3A of the mandrel 3, and guiding the laminated cylindrical element 4 to the base end side of the mandrel 3 while ejecting air into between the mandrel 3 and the laminated cylindrical element 4. Thereby, since an air space can be formed between the mandrel 3 and the laminated cylindrical element 4 to guide the laminated cylindrical element 4 to the base end side of the mandrel 3, the cylinder-shaped laminated cylindrical element 4 with no taper, in which its inner circumferential length is set less than or equal to the outer circumferential length of the mandrel 3, can be easily attached to the mandrel 3.

Accordingly, since ease of attachment can be secured without forming the mandrel 3 in a tapered form in which its diameter decreases toward the tip and also without forming the laminated cylindrical element 4 in a tapered from in which its diameter decreases toward the tip, the laminated cylindrical element 4 can be produced by cutting a film-like material, which is formed in a long cylindrical body with a constant diameter, with predetermined dimensions. As a result, the manufacturing costs of the plastic container can be reduced, and the manufacturing efficiency thereof can be improved. Additionally, since the laminated cylindrical element 4, in which its inner circumferential length is set less than or equal to the outer circumferential length of the mandrel 3, can be used without requiring to enlarge the laminated cylindrical element 4 with respect to the mandrel 3, occurrence of wrinkles or the like can be suppressed and the quality of the cylindrical container can also be maintained.

Second Embodiment

Next, a second embodiment of the present invention will be described. The present embodiment is different from the first embodiment in terms of the shape of the mandrel that is a mold core. In the following, parts common to those of the first embodiment will be designated by the same reference numerals, descriptions thereof will be omitted, and mainly differences will be described.

Figure 8:
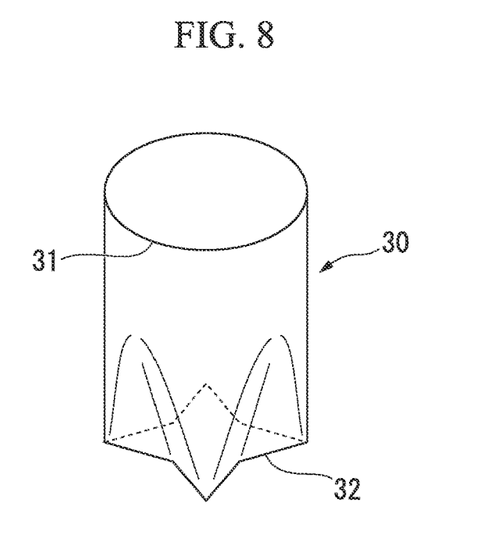
FIG. 8 is a perspective view of a mold core related to a second embodiment of the present invention.

A mandrel 30 of the present embodiment is shown in FIG. 8. In FIG. 8, the upper side in the drawing is defined as the base end side of the mandrel 30, and the lower side in the drawing is defined as the tip side of the mandrel 30. As shown in FIG. 8, the mandrel 30 of the present embodiment is a rod-like body in which its cross-sectional shape (cross-section in the direction orthogonal to the longitudinal direction) from a base end part 31 to a tip portion 32 is not constant, but the outer circumferential length thereof at the interval from the base end part 31 to the tip portion 32 is set constant.

Figure 9:
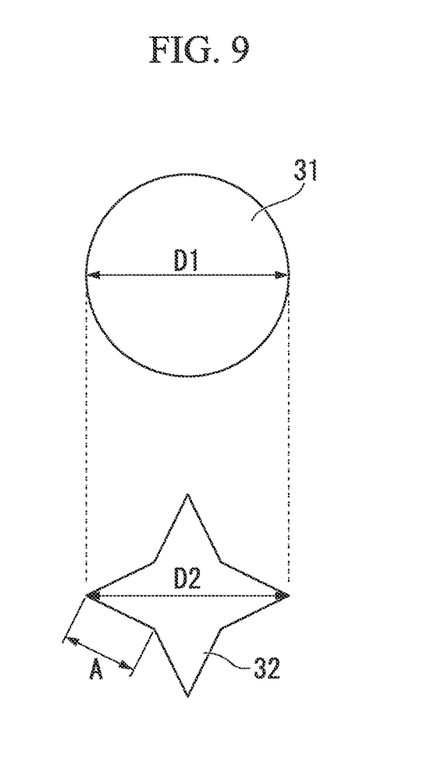
FIG. 9 is a view illustrating the shape of the mold core related to the second embodiment of the present invention.

A circular cross-section of the base end part 31 and a polygonal cross-section of the tip portion 32 in the mandrel 30 are shown in FIG. 9. The cross-section of the tip portion 32 is octagonal, and the lengths of all sides thereof are the same. In FIG. 9, symbol A represents the length of one side of the tip portion 32, symbol D1 represents the diameter (external diameter) of the base end part 31, and symbol D2 represents the maximum external diameter of the tip portion 32.

It will be described in detail that the outer circumferential length from the base end part 31 to the tip portion 32 in the mandrel 30 is constant, with reference to FIG. 9. The outer circumferential length (8×A) of the tip portion 32 is equal to the outer circumferential length (πD1) of the base end part 31. Additionally, the cross-section located between the base end part 31 and the tip portion 32 is also set to have an outer circumferential length equal to those of the circular cross-section of the base end part 31 and the polygonal cross-section of the tip portion 32.

Additionally, in the mandrel 30, the external diameter D1 of the base end part 31 is set to be the maximum diameter in the whole longitudinal region of the mandrel 30 in consideration of ease of removal from the mold. In other words, the mandrel 30 is formed so that a part with a larger external diameter than the external diameter D1 of the base end part 31 is not present between the base end part 31 and the tip portion 32. For example, in the present embodiment, the maximum external diameter D2 of the tip portion 32 is equal to the external diameter D1 of the base end part 31. In addition, the external diameter is the distance between opposed locations that are connected by a straight line passing through the central point of the mandrel 30 in the cross-section of the mandrel 30. Additionally, in the mandrel 30, the maximum external diameter of a cross-section located on the tip side may be set to be less than or equal to the maximum external diameter of a cross-section located on the base end side. By setting like this, a plastic container after molding can be easily extracted from the mandrel 30.

Figure 10:
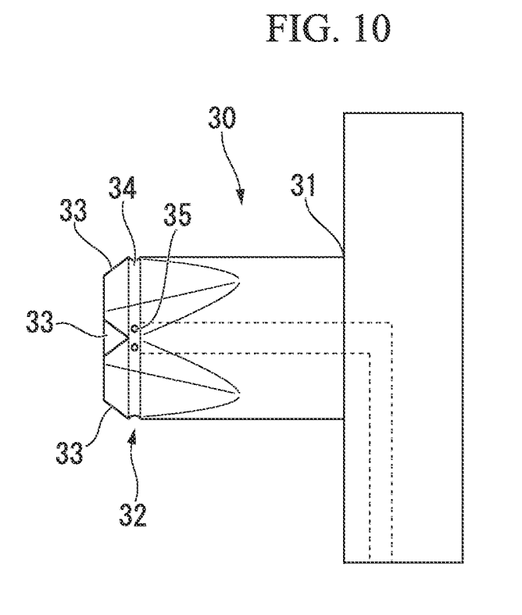
FIG. 10 is a side view of the mold core related to a second embodiment of the present invention.

In addition, although omitted in FIG. 8, as shown in FIG. 10, the tip portion 32 of a mandrel 30 is formed with a chamfered portion 33, groove portion 34, and ejection hole 35, similar to those of the first embodiment. In the attachment of the laminated cylindrical element 4 to the mandrel 30, similarly to the first embodiment, the laminated cylindrical element 4 is pressed onto the tip portion 32 of the mandrel 30 from the chamfered portion 33 side, and the laminated cylindrical element 4 is guided toward the base end part 31 of the mandrel 30 while ejecting air into between the mandrel 30 and the laminated cylindrical element 4 from the ejection hole 35.

Figure 11:
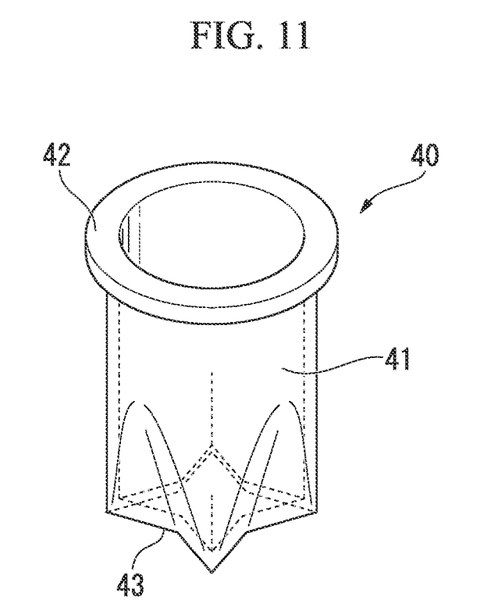
FIG. 11 is a perspective view showing a plastic container molded in the second embodiment of the present invention.

A plastic container 40 molded using the mandrel 30 is shown in FIG. 11. The plastic container 40 includes a trunk portion 41 molded in a cylindrical shape by the laminated cylindrical element 4, an upper molded portion 42 molded integrally with one end of the trunk portion 41, and a lower molded portion 43 molded integrally with the other end of the trunk portion 41. The upper molded portion 42 is an annular molded body, and is provided on the outer peripheral surface of the one end of the trunk portion 41. The lower molded portion 43 is provided so as to close the other end of the trunk portion 41, and has a polygonal shape corresponding to the shape of the tip portion 32 of the mandrel 30.

Even in this embodiment, the manufacturing costs of the plastic container can be reduced, the manufacturing efficiency thereof can be improved, and the quality of the cylindrical container can also be maintained. Additionally, a plastic container with a shape having rich variations can also be produced.

In addition, the configurations in the first and second embodiments described above are examples of the present invention, and various changes can be made in part configuration, structure, shape, size, number, arrangement, or the like without departing from the scope of the invention. For example, in the first embodiment, the chamfered portion 13 formed at the tip portion 3A of the mandrel 3 is formed by so-called C-chamfering (its cross-sectional shape at a plane including the central axis of the mandrel 3 becomes a straight line). Instead of this, however, arcuate chamfering may be performed. In such an arcuate chamfered portion, the cross-sectional shape at a plane including the central axis of the mandrel 3 becomes an arc.

Additionally, a separate body core having an external diameter less than the external diameter of the mandrel 3 may be attached to the tip portion 3A of the mandrel 3, without performing chamfering. In addition, the external diameter of the separate body core is set to be less than the internal diameter of the laminated cylindrical element 4 before the attaching and covering.

Additionally, an example in which the plastic container 20 is cylindrical and the laminated cylindrical element 4 is also cylindrical has been described in the first embodiment. However, the present invention can also be applied to a case where the trunk portion of the plastic container is rectangular in cross-sectional view.

Additionally, an example in which the laminated cylindrical element 4 is attached to the mandrel 3, 30 using the delivery jig 9 has been described in the present embodiment. However, the configurations of the delivery jig 9 may be other aspects, for example, the cross-sectional shape of the delivery jig body 15 may not be constant in the longitudinal direction. Additionally, the laminated cylindrical element 4 may be manually attached to the mandrel 3, 30. Additionally, in the present embodiment, the cylindrical element made of resin is attached to the mold core. However, the present invention can also be applied to a case where the cylindrical element is made of a metallic material.

EXAMPLE 1

Next, examples of the present invention will be described.

In Example 1, specific dimensions of the mandrel 3 and the laminated cylindrical element 4 described in the first embodiment were set, the laminated cylindrical element 4 was attached to the mandrel 3, and molding was performed.

As the mandrel 3, a member having a diameter of 55.66 mm and an outer circumferential length of 174.86 mm was used. As the laminated cylindrical element 4, a member having a diameter of 54 mm and an outer circumferential length of 169.64 mm and that is small by 3.07% ((55.66−54)/54) with respect to the diameter of the mandrel 3 and is small by 3.07% ((174.86−169.64)/169.64) with respect to the outer circumferential length of the mandrel 3.

Additionally, as the material of the laminated cylindrical element 4, a member including high-density polyethylene (may also be referred to as "HDPE"; 100 μm in thickness), an adhesive, PET (12 μm in thickness), an adhesive, an aluminum foil (12 μm in thickness), an adhesive, and HDPE (120 μm in thickness) was used.

In this example, it was possible to confirm that the laminated cylindrical element 4 is easily attached to the mandrel 3 by pressing the laminated cylindrical element 4 having diameter and inner circumferential length that are less than those of the mandrel 3 onto the tip of the mandrel 3, and then guiding the laminated cylindrical element 4 to the base end side of the mandrel 3 while ejecting air. It was possible to confirm that a container with favorable appearance and functionality is also obtained without generation of wrinkles or the like in the container after molding. In addition, when attachment and molding was performed using a member including HDPE (100 μm in thickness), an adhesive, PET (12 μm in thickness), an adhesive, aluminum vapor deposition (12 μm in thickness), an adhesive, and HDPE (120 μm in thickness) as the material of the laminated cylindrical element 4, with the same dimension settings as the above, favorable results were obtained similarly.

EXAMPLE 2

Even in Example 2, specific dimensions of the mandrel 3 and the laminated cylindrical element 4 described in the first embodiment were set, the laminated cylindrical element 4 was attached to the mandrel 3, and molding was performed.

As the mandrel 3, a member having a diameter of 34.14 mm and an outer circumferential length of 107.25 mm was used. As the laminated cylindrical element 4, a member that has a diameter of 33.74 mm and an outer circumferential length of 106.00 mm and that is small by 1.19% ((34.14−33.74)/33.74) with respect to the diameter of the mandrel 3 and is small by 1.18% ((107.25−106.00)/106.00) with respect to the outer circumferential length of the mandrel 3.

Additionally, as the material of the laminated cylindrical element 4, a member including HDPE (50 μm in thickness), an adhesive, PET (12 μm in thickness), an adhesive, aluminum oxide vapor deposition (12 μm in thickness), an adhesive, and HDPE (120 μm in thickness) was used.

Even in this example, it was possible to confirm that the laminated cylindrical element 4 is easily attached to the mandrel 3 by guiding the laminated cylindrical element 4 having diameter and inner circumferential length that are less than those of the mandrel 3 to the base end side of the mandrel 3 while ejecting air. It was able to confirm that a container with favorable appearance and functionality was also obtained without the generation of wrinkles or the like in the container after molding.

REFERENCE SIGNS LIST 3, 30: Mandrel (Mold core)
3A, 32: Tip portion
4: Laminated cylindrical element (Thin cylindrical element)
10, 34: Groove portion
11, 35: Ejection hole (Gas ejection hole)
13, 33: Chamfered portion (Inducing portion)
20, 40: Plastic container
21, 41: Trunk portion

The invention claimed is:

1. A method for producing a cylindrical container, which includes a cylindrical trunk portion and a lower molded portion molded integrally with an end of the trunk portion, using a molding tool formed of a stationary mold and a mold core movable forward and backward with respect to the stationary mold, the method comprising:
   an attaching step of, attaching a thin cylindrical element and a circular film to the mold core, the thin cylindrical element being formed in a cylindrical shape having a constant cross-sectional shape, being formed of a plastic laminate film, and being made into the trunk portion, the circular film forming a part of the lower molded portion;
   a molding step of, after the attaching step, molding the lower molded portion by mounting the mold core on the stationary mold, and injecting a synthetic resin material between the mold core and the stationary mold to integrate the thin cylindrical element, the circular film, and the synthetic resin material so as to form the cylindrical container; and
   a removal step of, after the molding step, removing the cylindrical container from the mold core,
   wherein during the attaching step:
      the circular film is fitted into an inside of the thin cylindrical element;
      the thin cylindrical element is pressed onto a tip portion of the mold core;
      the thin cylindrical element is guided and moved to a base end side of the mold core while ejecting gas into between the mold core and the thin cylindrical element;
      the circular film slides with respect to the thin cylindrical element as the thin cylindrical element moves; and
      the thin cylindrical element is attached to an outer surface of the mold core in a manner so as to cover the mold core, and
   in the removal step, the cylindrical container is removed from the mold core while ejecting gas between the mold core and the cylindrical container.

2. The method for producing a cylindrical container according to claim 1, wherein the mold core is formed in a rod-like body having a constant outer circumferential length, and the outer circumferential length is set to be greater than or equal to an inner circumferential length of the thin cylindrical element.

3. The method for producing a cylindrical container according to claim 1, wherein an outer diameter of the mold core is largest at a base end of the mold core.

4. The method for producing a cylindrical container according to claim 1, wherein
   an outer surface of the tip portion of the mold core is formed with a gas ejection hole,
   during the attaching step, gas is ejected between the mold core and the thin cylindrical element from the gas ejection hole, and
   during the removal step, gas is ejected between the mold core and the cylindrical container from the gas ejection hole.

5. The method for producing a cylindrical container according to claim 4, wherein
   the outer surface of the tip portion of the mold core is formed with a groove portion, and the groove portion is formed with the gas ejection hole.

6. The method for producing a cylindrical container according to claim 1, wherein the tip portion of the mold core is provided with an inducing portion that facilitates pressing the thin cylindrical element.

7. The method for producing a cylindrical container according to claim 6, wherein
the inducing portion is a chamfered portion formed at the tip portion of the mold core.

8. The method for producing a cylindrical container according to claim 6, wherein
the inducing portion is a separate body core that is attached to the tip portion of the mold core and has an outer diameter less than the outer diameter of the mold core.

* * * * *